United States Patent
Bhushan et al.

(10) Patent No.: US 12,288,574 B1
(45) Date of Patent: Apr. 29, 2025

(54) IDENTIFYING HEAT ASSISTED RECORDING LASER STABILITY USING RAMPED TEMPERATURE CALIBRATION

(71) Applicant: SEAGATE TECHNOLOGY LLC, Fremont, CA (US)

(72) Inventors: Sandeep Bhushan, Longmont, CO (US); Lewis Scott Kessinger Patterson, Glenn Dale, MD (US); Phillip Kevin McGinnis, Longmont, CO (US); Piengphen Swangsmutchai, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/615,310

(22) Filed: Mar. 25, 2024

(51) Int. Cl.
*G11B 11/10* (2006.01)
*G11B 5/02* (2006.01)
*G11B 27/36* (2006.01)
*G11B 5/00* (2006.01)

(52) U.S. Cl.
CPC ............... *G11B 5/02* (2013.01); *G11B 27/36* (2013.01); *G11B 2005/0021* (2013.01)

(58) Field of Classification Search
CPC .......... G11B 11/10; G11B 11/105; G11B 2005/0021; G11B 7/126; G11B 7/1263; G11B 7/1267; G11B 5/00; G11B 5/09

USPC ............................................. 360/59
See application file for complete search history.

(56) References Cited

U.S. PATENT DOCUMENTS

| | | | |
|---|---|---|---|
| 9,236,081 B1 | 1/2016 | Chu | |
| 9,595,288 B1 | 3/2017 | Chu | |
| 9,892,752 B1 * | 2/2018 | Chu | ................ G11B 5/5534 |
| 10,515,658 B1 | 12/2019 | Mader | |

* cited by examiner

*Primary Examiner* — Nabil Z Hindi
(74) *Attorney, Agent, or Firm* — Mueting Raasch Group

(57) ABSTRACT

A method for calibrating a hard drive having a heat-assisted magnetic recording head is provided. The method includes performing, across an increasing temperature ramp, a first set of write/read operations using the head, performing, across a decreasing temperature ramp, a second set of write/read operations using the head, generating performance data associated with the head based on the first set of write/read operations and the second set of write/read operations, calculating a comparison value based on the performance data associated with the head and performance data associated with a plurality of heads, and adjusting an operating parameter value of the head based on the comparison value exceeding a threshold, the adjusted operating parameter reducing a likelihood that a laser of the head will exhibit write instability.

20 Claims, 6 Drawing Sheets

IDENTIFYING HEAT ASSISTED RECORDING LASER STABILITY USING RAMPED TEMPERATURE CALIBRATION

SUMMARY

The present disclosure is directed to field reliability improvement through selective treatment of laser power variation in storage media, e.g., by identifying heat assisted recording laser power variations using ramped temperature testing. In one embodiment, a method for calibrating a hard drive having a heat-assisted magnetic recording head is provided. The method includes performing, across an increasing temperature ramp, a first set of write/read operations using the head, performing, across a decreasing temperature ramp, a second set of write/read operations using the head, generating performance data associated with the head based on the first set of write/read operations and the second set of write/read operations, calculating a comparison value based on the performance data associated with the head and performance data associated with a plurality of heads, and adjusting an operating parameter value of the head based on the comparison value exceeding a threshold, the adjusted operating parameter reducing a likelihood that a laser of the head will exhibit write instability.

In another embodiments, a method for calibrating a plurality of hard drives each having a plurality of heat-assisted magnetic recording heads is provided. The method includes performing, for each head included in the plurality of hard drives and across an increasing temperature ramp, a first set of write/read operations using the head, performing, for each head included in the plurality of hard drives and across a decreasing temperature ramp, a second set of write/read operations using the head, generating, for each head included in the plurality of hard drives, performance data associated with the head based on the first set of write/read operations and the second set of write/read operations, calculating, for each head included in the plurality of hard drives, a comparison value based on the performance data associated with the head and performance data associated with other heads included in the plurality of hard drives, selecting at least one head included in the plurality of hard drives for adjustment based on the comparison value associated with each head included in the plurality of hard drives and a predetermined threshold, and adjusting, for each head included in the at least one head, an operating parameter value of the head, the adjusted operating parameter reducing a likelihood that a laser of the head will exhibit write instability.

In yet another embodiments, a system for calibrating a plurality of hard drives each having a plurality of heat-assisted magnetic recording heads is provided. The system includes a temperature controllable chamber containing the plurality of hard drives, a controller coupled to the temperature controllable chamber and configured to cause the temperature controllable chamber to increase temperature across a first temperature ramp, perform, for each head included in the plurality of hard drives and across the first temperature ramp, a first set of write/read operations using the head, cause the temperature controllable chamber to decrease temperature across a second temperature ramp, perform, for each head included in the plurality of hard drives and across the second temperature ramp, a second set of write/read operations using the head, generate, for each head included in the plurality of hard drives, performance data associated with the head based on the first set of write/read operations and the second set of write/read operations, calculate, for each head included in the plurality of hard drives, a comparison value based on the performance data associated with the head and performance data associated with other heads included in the plurality of hard drives, select at least one head included in the plurality of hard drives for adjustment based on the comparison value associated with each head included in the plurality of hard drives and a predetermined threshold, and adjust, for each head included in the at least one head, an operating parameter value of the head, the adjusted operating parameter reducing a likelihood that a laser of the head will exhibit write instability.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
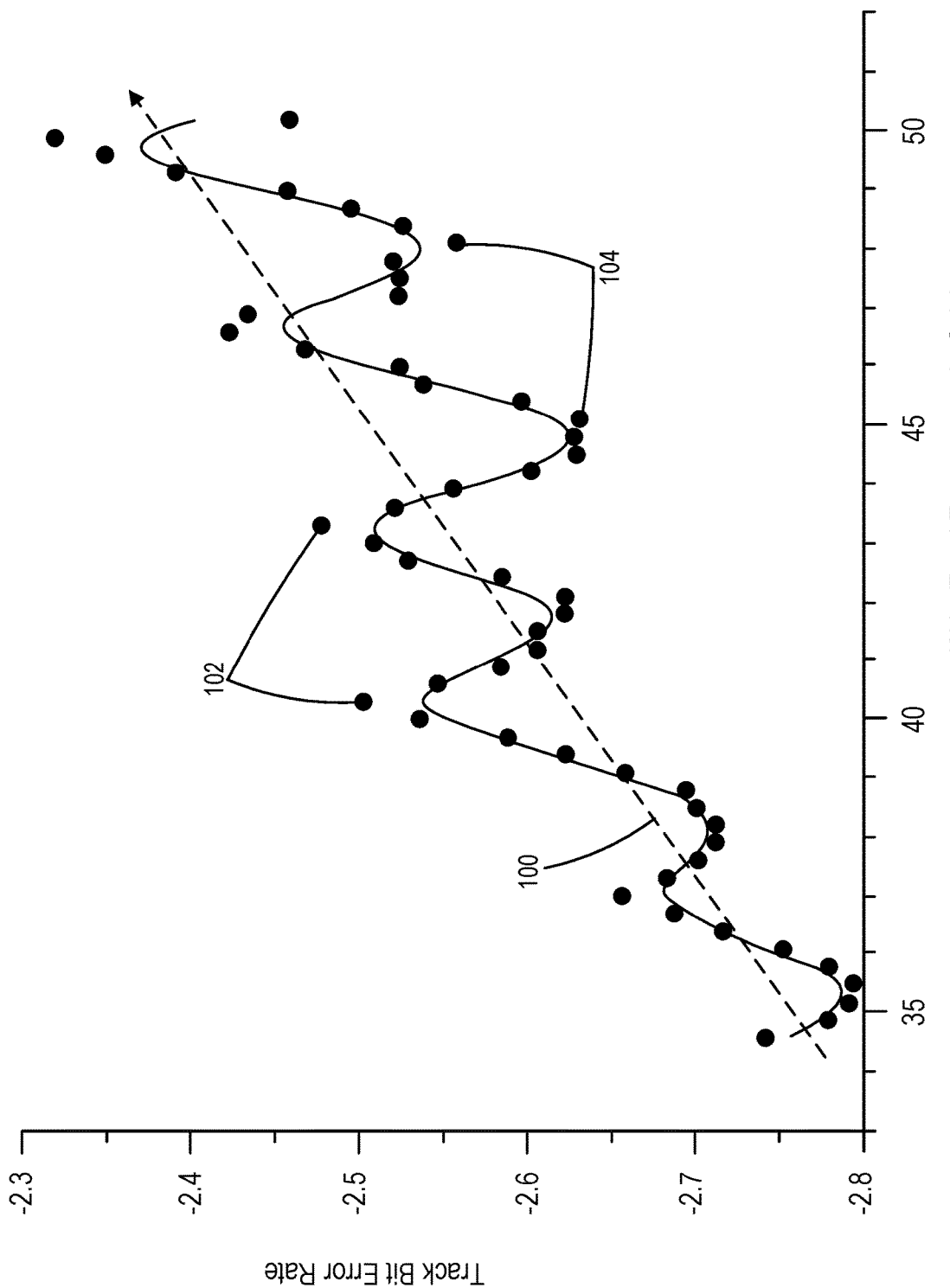
FIG. 1 is an exemplary graph of laser power variation at different operating temperatures.

The present disclosure is generally related to certain hard disk drives such as heat-assisted magnetic recording (HAMR) drives. In order to increase capacity of the drives, higher areal density disk drive technologies such as HAMR are used. A HAMR drive can have significantly higher areal density than a conventional disk drive (e.g., perpendicular magnetic recording) and will be increasingly used in large data centers in order to reduce total cost per unit of storage. A HAMR drive uses magnetic disks and read heads similar in many aspects as those used in conventional hard disk drives. The recording head on a HAMR drive is different in that it uses an energy source (e.g., a laser diode) to heat the recording medium as it is being recorded. This forms a small hotspot with lower magnetic coercivity compared to the region outside the hotspot. A magnetic field applied by the HAMR write head only changes magnetic orientation in the hotspot without affecting the surrounding region. This allows a HAMR drive to write significantly narrower tracks than a conventional drive.

The laser or other power source included in the head may be prone to variances in performance that can negatively affect the ability of the head to suitably write and read data. Generally, most lasers, including those integrated into heat assisted magnetic recording heads, are prone to instability via back reflection, manufacturing defects and internal and external temperature change. The lasers are prone to power variations. One class of variations is related to the change in laser efficiency as a function of temperature, in which power efficiency drops off as temperature increases. Another class of variations is related to periodic changes in laser efficiency as a function of temperature. A third class of variations, also referred to as "mode hopping," is related to random instability that may be caused by temperature and/or other factors.

These power variations can negatively impact the HAMR write/read head. This instability shows up in a recording system as variation in light power delivered from the head to the media. This variation in power, when high enough, can cause variation in bit error rates. In extreme loss cases, it can result in loss of user data.

Previous approaches to deal with laser power variation in HAMR heads all have drawbacks. One approach is to deactivate the head entirely, which causes the loss of all potential storage associated with the head. In some approaches, all heads included in a hard drive are adjusted even though only one head may be performing below performance expectations. This can result in lower drive performance, e.g., areal density capacity (ADC) than might be achieved if not for the low-performing head. Furthermore, detection of the underlying factors resulting in failing heads has been limited. Without a robust method for identifying failing heads and the reasons for the failures, individual heads cannot be targeted for performance adjustments. Embodiments described below can provide approaches for targeting individually failing heads, as well as adjusting the individually failing heads to prevent complete loss of the failing head.

FIG. 1 is an exemplary graph of laser power variation at different operating temperatures. Track error rate is plotted as a function of write/read temperature, with trend line 100 indicating a periodic type of variation in track bit error rate with increasing temperatures. Certain data points 102 are indicative of sudden laser power jumps that cause higher bit error rates than would be expected and other data points 104 have lower than expected bit error rates. In some aspects, these data points 102, 104 may be outliers.

Figure 2:
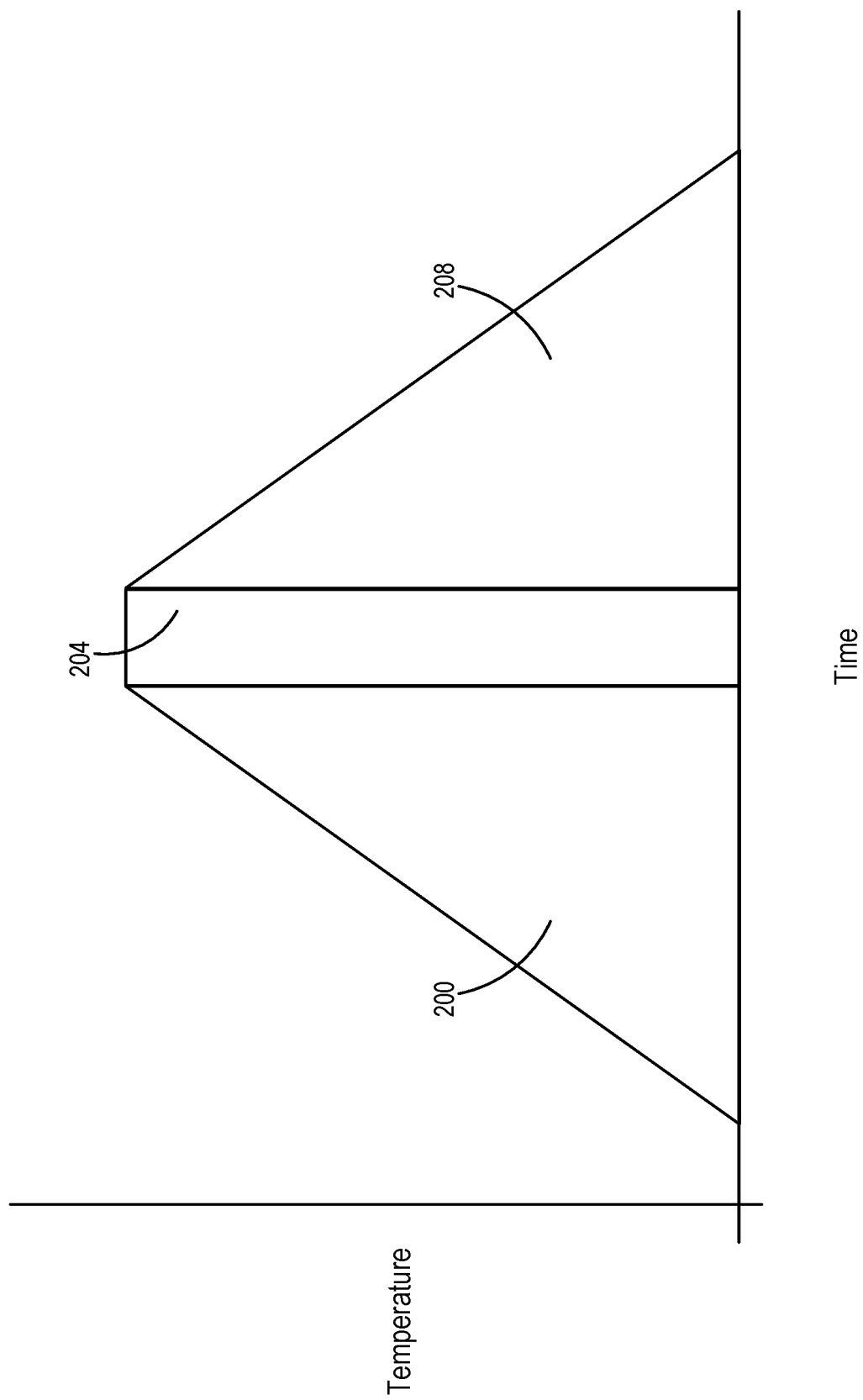
FIG. 2 is an exemplary graph of a temperature ramp protocol according to example embodiments.

FIG. 2 is an exemplary graph of a temperature ramp protocol according to example embodiments. The temperature ramp protocol can be used to detect heads that are prone to unpredictable laser power variations, and subsequently, a loss in write/read performance. The temperature ramp protocol includes three portions: an increasing temperature ramp stage 200, a temperature maintenance stage 204 following the increasing temperature ramp stage 200, and a decreasing temperature ramp stage 208 following the temperature maintenance stage 204. The temperatures refer to an ambient temperature to which the drive is subjected while the operations are carried out.

One or more heads included in one or more hard drives can be tuned using the temperature ramp protocol. During the increasing temperature ramp stage 200, a number of write/read operations are executed using each head across a number of temperatures. As used herein, "write/read operations" refer to performing a series of write operations to write data to a predetermined portion of a storage medium using a head, followed by reading back the written data in a series of read operations. In this way, the ability of the head to write and read date using a HAMR technique can be measured.

Performance data for each can be generated based on the write/read operations for each head. For example, the performance data can include bit error rate indicative of errors in the write/read operations. In some embodiments, the write/read operations can be performed over different portions of the hard drive storage medium, such as tracks within different zones on each platter surface of each hard drive. The tests are repeated on the same set of tracks for the different test phases, such performance across platters can be compared more accurately.

The increasing temperature ramp stage 200 can include increasing an ambient temperature surrounding the hard drive from a first predetermined temperature to a second predetermined temperature. In some embodiments, the first predetermined temperature can be thirty degrees Celsius, and the second predetermined temperature can be sixty-five degrees Celsius. The write/read operations can be executed at a predetermined temperature interval across the increasing ambient temperature. For example, the predetermined temperature intervals can be 0.5 degrees Celsius. Thus, in some embodiments, write/read operations are performed every 0.5 degrees Celsius from thirty degrees Celsius to sixty-five degrees Celsius.

During the temperature maintenance stage 204, the ambient temperature can be maintained at the second predetermined temperature until the beginning of the decreasing temperature ramp stage 208. Additionally, during the temperature maintenance stage 204, performance data generated during the increasing temperature ramp stage 200 can be used to calculate temperature coefficients associated with each head. Generally, the temperature coefficients are calibration values derived from the tests in the ramp stage 200, such that a predetermined input (e.g., a value input into a digital to analog converter) can result in a desired pattern written to the disk (e.g., a series of bits having a desired track width). Each temperature coefficient can be associated with the laser included in the head. The temperature coefficients are part of the drive calibration that optimizes laser performance, and are stored in drive firmware for use during subsequent write operations in the factory and while fielded.

During the decreasing temperature ramp stage 208, the coefficients can be used during write/read operations to generate a second set of performance data that is potentially more useful than the performance data generated based on the write/read operations executed during the increasing temperature ramp stage 200. This is because errors seen in the decreasing temperature ramp stage 208 are more likely to be due to unpredictable thermal responses than from mis-calibration of the lasers.

During the decreasing temperature ramp stage 208, a number of write/read operations are executed using each head across a number of temperatures. The write/read operations can be similar to the write/read operations executed in the increasing temperature ramp stage 200. Performance data can be generated based on the write/read operations in the decreasing temperature ramp stage 208. The performance data associated with the decreasing temperature ramp stage 208 may be used to identify underperforming heads.

The underperforming heads can be individually dealt with by decreasing performance margins, e.g., configuring the head to record using parameters that allow running the lasers at a lower power. This will decrease performance for the disk surface associated with the head, but allows other heads in the drive to operate at a higher performance level. Thus the impact of running the head at lower margins only impacts one disk surface. For drives with multiple disks, e.g., four disks or more, this can result in the overall drive still having a good ratio of ADC to cost. Additional details of adjusting head margins is discussed below in regards to FIG. 5.

The decreasing temperature ramp stage 208 can include decreasing the ambient temperature surrounding the hard drive from the second predetermined temperature to the first predetermined temperature. The write/read operations can be executed at the predetermined temperature interval across the decreasing ambient temperature. As described above, the predetermined temperature intervals can be 0.5 degrees Celsius. Thus, in some embodiments, write/read operations are performed every 0.5 degrees Celsius from sixty-five degrees Celsius to thirty degrees Celsius during the decreasing temperature ramp stage 208.

After performance data (e.g., bit error rates) has been generated for each head and/or laser included in each head, underperforming heads can be identified. It has been found that identifying statistical outliers is more useful than simply comparing the performance data to a threshold value. This is due to the laser instability occurring infrequently and unpredictably in many cases, such that standard statistical methods, e.g., using average or median bit error rate, might obscure the existence of statistical outliers in the underperforming heads.

Figure 3:
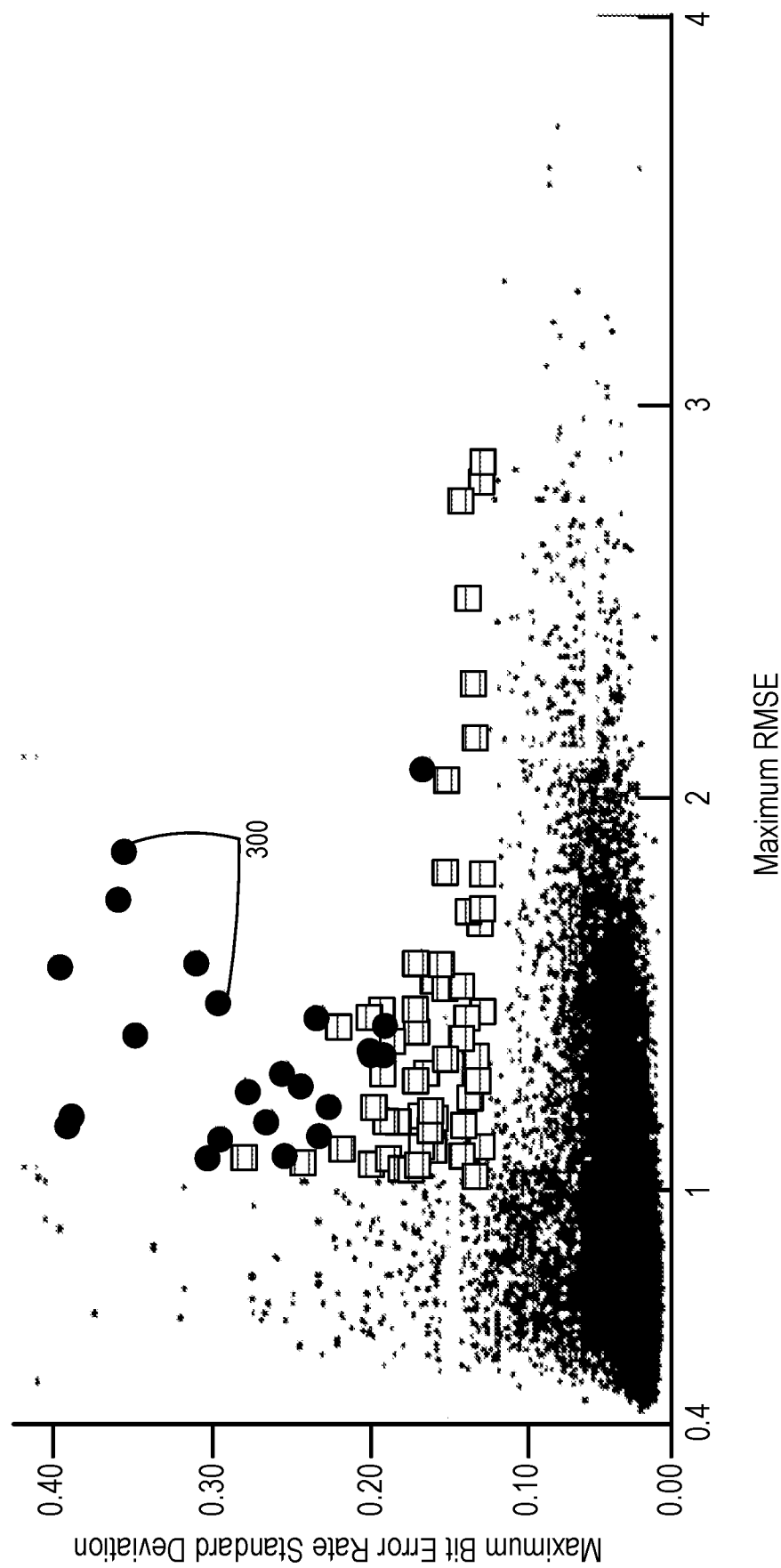
FIG. 3 is an exemplary graph of outliers detected in write/read data.

FIG. 3 shows a graph of outliers detected in write/read data. In the graph, maximum bit error rate standard deviation is plotted as a function of maximum root mean square error (RMSE). Outliers 300 are identified with a large black circle. Heads and/or lasers identified as outliers are selected for operating parameter adjustments, which will be detailed below.

Figure 4:
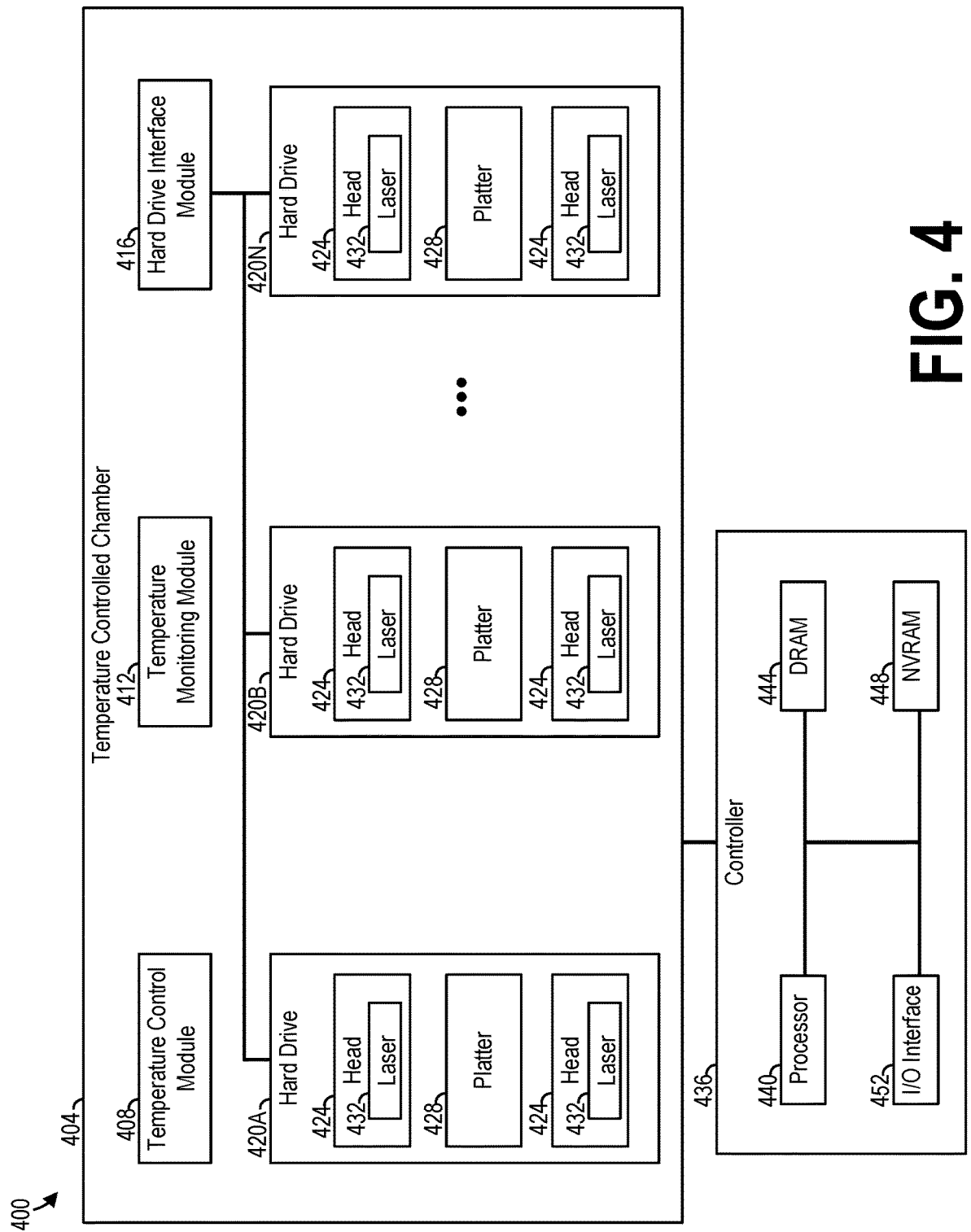
FIG. 4 is a block diagram of a temperature ramp test system according to an example embodiment.

In FIG. 4, a block diagram shows components of a temperature ramp test system 400 according to an example embodiment. The system 400 includes a temperature controlled chamber 404 and a controller 436 coupled to the temperature controlled chamber 404. The temperature controlled chamber 404 can be a volume with a substantially homogenous ambient temperature. The temperature controlled chamber 404 can include a temperature control module 408 configured to adjust the ambient temperature of the temperature controlled chamber 404. In some embodiments, the temperature control module 408 can include resistive heater, hot air heat exchanger, or other heat transfer means known in the art. The temperature controlled chamber 404 can include a temperature monitoring module 412. The temperature monitoring module 412 can include one or more sensors configured to monitor the ambient temperature of the temperature controlled chamber 404. In some embodiments, a portion of or all of the temperature monitoring module 412 can be included in the temperature control module 408.

The temperature controlled chamber 404 includes one or more hard drives 420A-N. The one or more hard drives 420A-N are coupled to a hard drive interface module 416 included in the temperature controlled chamber 404. The hard drive interface module 416 can provide and/or receive write/read test data to each of the one or more hard drives 420A-N. In some embodiments, the hard drive interface module 416 can include a serial ATA (SATA) interface and/or a serial attached SCSI (SAS) interface.

Each of the one or more hard drives 420A-N includes one or more heads 424 and one or more recording mediums such as a platter 428. In some embodiments, two heads 424 can be associated with each platter 428 included in each of the hard drives 420A-N. More specifically, each side of the platter 428 can be associated with a head included in the one or more heads 424. Each head 424 can be configured to read and write data to the platter 428. Each head 424 includes a laser 432 configured to heat the platter 428. In some embodiments, the head 424 can include an energy source other than a laser that is configured to heat the platter 428.

The laser 432 can increase capacity of the hard drives 420A-N by enabling heat-assisted magnetic recording (HAMR). A HAMR drive can have significantly higher areal density than a conventional disk drive (e.g., perpendicular magnetic recording) and will be increasingly used in large data centers in order to reduce total cost per unit of storage. Note that the techniques described above may be used in non-HAMR testing as well, assuming there are components that are known to exhibit thermal instability similar to that seen with HAMR lasers.

The controller 436 monitors and controls aspects of the temperature controlled chamber 404. The controller 436 includes one or more processors 440, e.g., central processing units, co-processors, etc. The processor 440 may be coupled to one or both volatile memory (e.g., dynamic random-access memory 444) and non-volatile memory (e.g., non-volatile random-access memory 448), which are referred to collectively as 'memory.' The processor 440 accesses and executes one or more computer programs or routines stored in the memory, as well as storing and retrieving other data to/from memory such as write/read settings, write/read performance data, etc.

The processor 440 is coupled to one or more input/output (I/O) interfaces 452. The I/O interface 452 facilitates communications between the processor 440 and the temperature controlled chamber 404. In some embodiments, the I/O interface 452 is coupled to the hard drive interface module 416. The I/O interface 452 can be coupled to the temperature control module 408 and/or the temperature monitoring module 412. In some embodiments, the I/O interface 452 can be coupled to one or more temperature sensors included in the temperature control module 408 and/or the temperature monitoring module 412.

The controller 436 can control the temperature control module 408 to ramp up, ramp down, or maintain the ambient temperature of the temperature controlled chamber 404 using the I/O interface 452 and the temperature control module 408. In some embodiments, the controller 436 can control the ambient temperature based on the temperature ramp protocol shown in FIG. 2. For example, the controller 436 can control the ambient temperature to implement the increasing temperature ramp stage 200, the temperature maintenance stage 204, and the decreasing temperature ramp stage 208. Additionally, the controller 436 can cause the hard drive(s) 420A-N to perform a series of write/read operations as described above at a variety of temperatures using the I/O interface 452 and the hard drive interface module 416. In this way, the controller 436 can generate write/read performance data for across temperature ramps for each head included in the hard drive(s) 420A-N. The processor 440 can store the performance data in the memory 444, 448.

The memory 444, 448 includes computer-readable instructions or applications that, when executed by the processor 440, cause the controller 436 to perform various calculations and/or issue commands. That is to say, the processor 440 and memory 444, 448 may together define a computing apparatus operable to process input data and generate the desired output to one or more components/devices.

Figure 5:
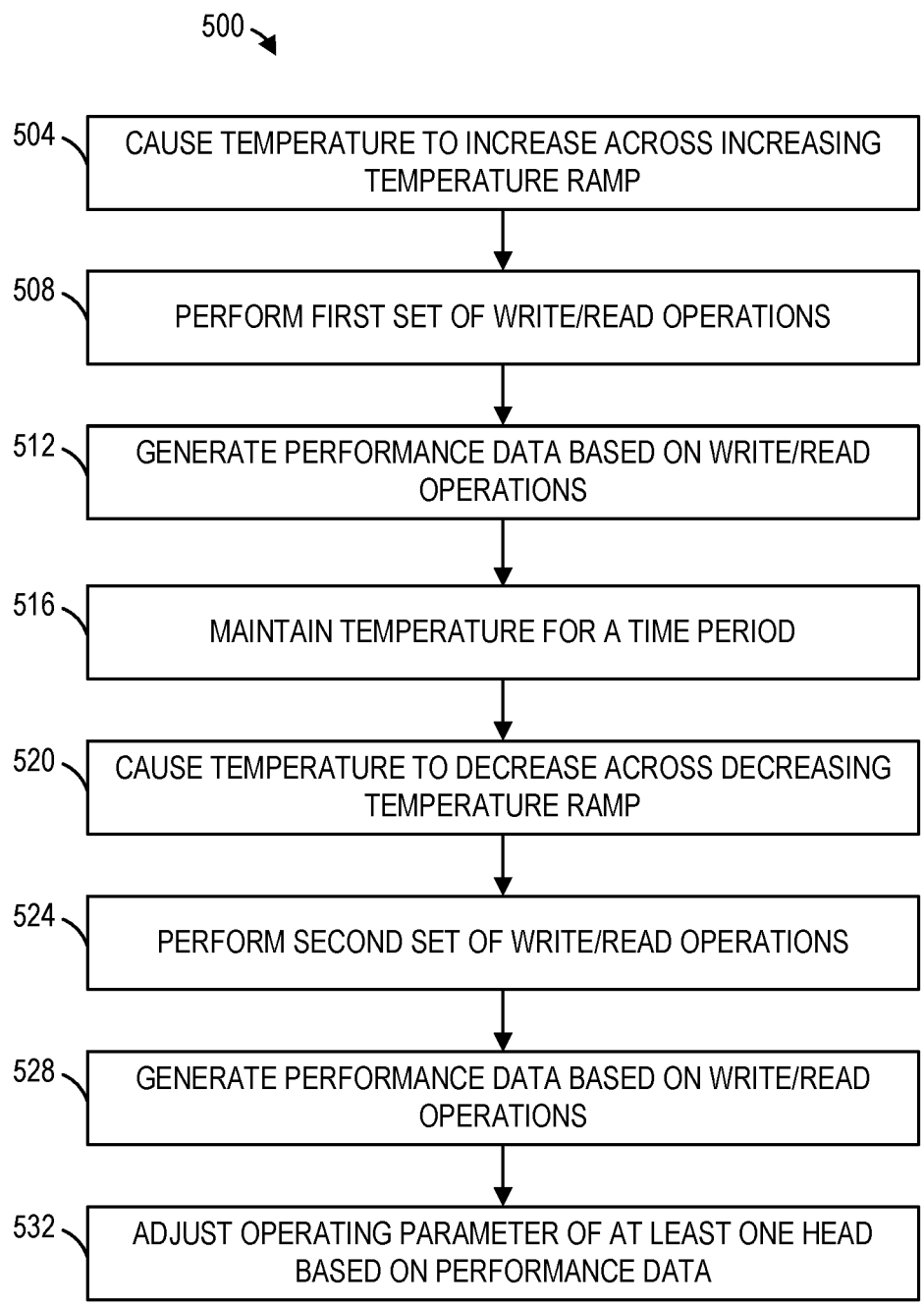
FIG. 5 is a flowchart of a method according to an example embodiment.

Referring to FIG. 4 as well as FIG. 5, a flowchart of a method 500 according to an example embodiment is shown. The method 500 can be implemented as computer-readable instructions on a memory (e.g., the memory 444, 448) and executed by a processor (e.g., the processor 440).

At 504, the method 500 can cause a temperature to increase across an increasing temperature ramp. The temperature can be an ambient temperature of one or more hard drives. In some embodiments, the method 500 can control the temperature controlled chamber 404 in FIG. 4 to adjust the ambient temperature of the one or more hard drives 420A-N. The increasing temperature ramp can increase the ambient temperature from a first predetermined temperature to a second predetermined temperature. In some embodiments, the first predetermined temperature can be thirty degrees Celsius, and the second predetermined temperature can be sixty-five degrees Celsius.

At 508, the method 500 can cause a first set of write/read operations to be performed using at least one head included in the one or more hard drives. The write/read operations are performed across the increasing temperature ramp. The write/read operations can be executed at a predetermined temperature interval across the increasing ambient temperature. The predetermined temperature intervals can be 0.5 degrees Celsius. Thus, in some embodiments, write/read operations are performed every 0.5 degrees Celsius from thirty degrees Celsius to sixty-five degrees Celsius during the increasing temperature ramp.

At 512, the method 500 can generate a first set of performance data based on the first set of write/read operations. The first set of performance data can include bit error rates for each head. The bit error rates can be indicative of how many read operations did not read the data that was supposed to be written during the write portion of the first set of write/read operations. For each head, the performance data can include bit error rates and/or other performance data for each temperature interval in the increasing temperature ramp.

At 516, the method 500 can maintain the ambient temperature for a time period. The ambient temperature can be the second predetermined temperature. In some embodiments, the method 500 can maintain the ambient temperature for long enough to calculate temperature coefficients for each laser included in each head based on the first set of performance data.

At 520, the method 500 can cause the ambient temperature to decrease across a decreasing temperature ramp. The decreasing temperature ramp can decrease the ambient temperature from the second predetermined temperature to the first predetermined temperature.

At 524, the method 500 can cause a second set of write/read operations to be performed using the at least one head included in the one or more hard drives. The write/read operations are performed across the decreasing temperature ramp. The write/read operations can be executed at the predetermined temperature interval across the decreasing ambient temperature. Thus, in some embodiments, write/read operations are performed every 0.5 degrees Celsius from sixty-five degrees Celsius to thirty degrees Celsius during the decreasing temperature ramp.

At 528, the method 500 can generate a second set of performance data based on the second set of write/read operations. The second set of performance data can include bit error rates for each head. The bit error rates can be indicative of how many read operations did not read the data that was supposed to be written during the write portion of the second set of write/read operations. For each head, the performance data can include bit error rates and/or other performance data for each temperature interval in the decreasing temperature ramp.

At 532, the method 500 can adjust an operating parameter of at least one head based on the first set of performance data and the second set of performance data. First, the method 500 can identify any outlier heads that may exhibit write instability. In some embodiments, the method 500 can generate a comparison value such as a standard deviation value. The method 500 can generate the standard deviation values based on one or more performance parameter values associated with each head. For example, the method 500 can generate standard deviation values for each head based on an overall bit error rate associated with each head. The method 500 may compare the standard deviation values to a threshold, and determine that standard deviation values exceeding the threshold are outliers. In some embodiments, the method 500 may generate the standard deviation values based on solely the first set of performance data or the second set of performance data. In other embodiments, the method 500 may generate the standard deviation values based on both the first set of performance data and the second set of performance data. The second set of performance data may be more helpful in identifying outlier because the second set of performance data is generated based on temperature coefficient values generated at 516.

Once any outlier heads are identified, the method 500 can adjust at least one operating parameter value of each outlier head in order to improve head performance. In some embodiments, the operating parameter value can be a tracks per inch (TPI) value. In some embodiments, the operating parameter value can be a bits per inch (BPI) value. Collectively, adjustment of TPI and/or BPI may be referred to as adjustments to bit aspect ratio (BAR). The method 500 can decrease TPI value and/or the BPI value for the head a predetermined amount, thereby adding operating margin to the head. In some embodiments, the method 500 can decrease TPI value and/or the BPI value by five percent. Decreasing either the TPI value or the BPI value by five percent has been found to provide a sufficient enough performance improvement to allow a marginal/outlier head to keep operating reliably.

By only adding margin to the identified outlier heads, the method 500 can save a platter and/or hard drive from losing total functionality, and providing the minimum performance reduction necessary to preserve data integrity. By reducing either the TPI value and/or the BPI value by five percent, the storage of the platter surface may remain at ninety-five percent of the originally intended capacity of the platter surface. Previous methods would have resulted in a one hundred percent loss of the platter surface storage capacity. Thus, the method 500 provides technique for identifying and calibrating failing individual heads in HAMR drives to reduce a likelihood that the head will exhibit write instability while minimally impacting overall drive performance. The method 500 may then proceed to 504 or end.

Figure 6:
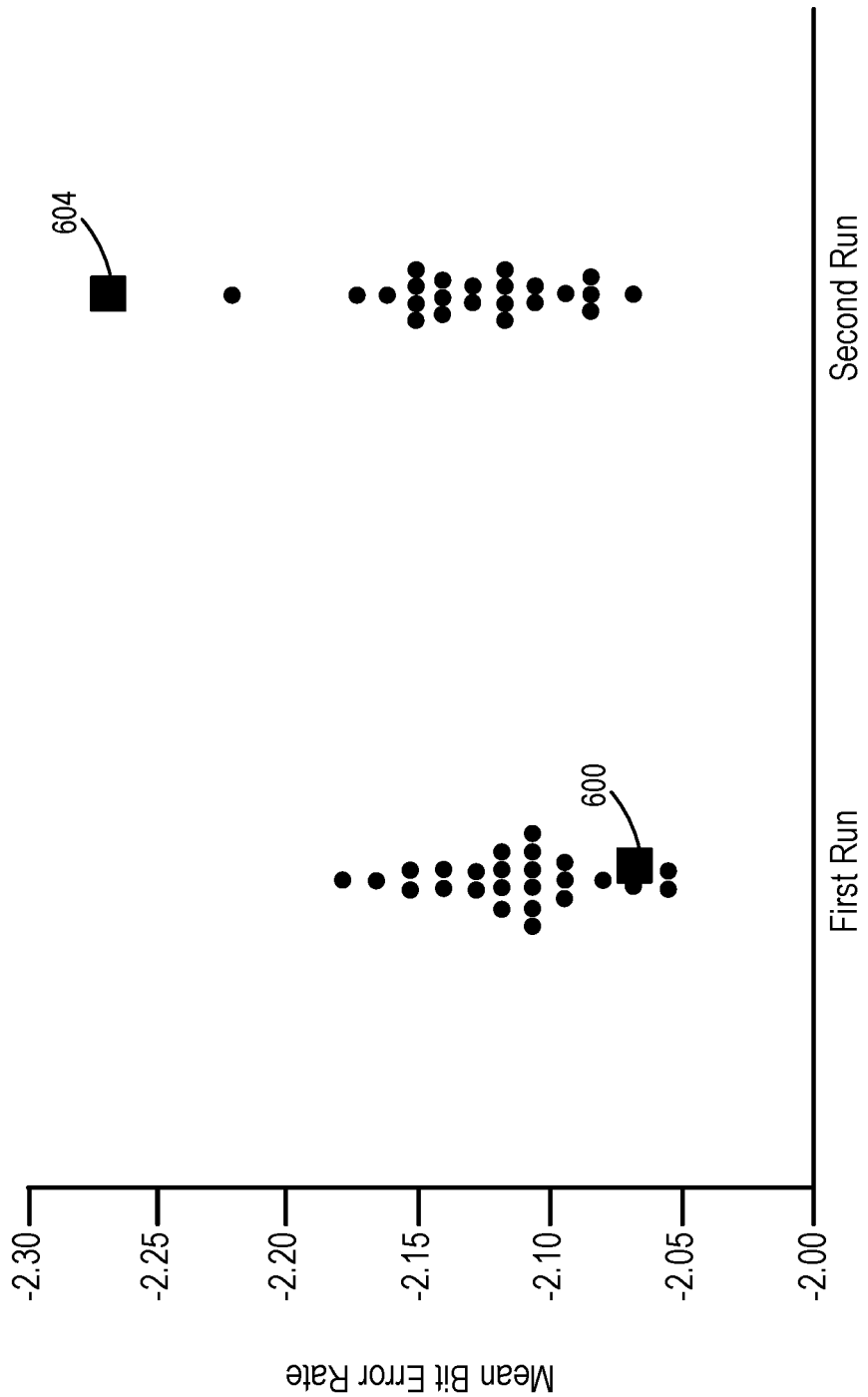
FIG. 6 is a graph of performance data before and after head adjustment according to the method in FIG. 5.

FIG. 6 is a graph of performance data before and after head adjustment according to the method in FIG. 5. Specifically, a first performance data 600 for a failing head was identified during a first temperature ramp protocol, and was adjusted as described at 532 in FIG. 5. During a subsequent temperature ramp protocol, second performance data 604 was identified for the same head. As can be seen in FIG. 6, the performance of the head improved so much that it became the best performing head in the group of heads.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by one or more processors. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A method for calibrating a hard drive having a heat-assisted magnetic recording head, the method comprising:
    performing, across an increasing temperature ramp, a first set of write/read operations using the head;
    performing, across a decreasing temperature ramp, a second set of write/read operations using the head;
    generating performance data associated with the head based on the first set of write/read operations and the second set of write/read operations;
    calculating a comparison value based on the performance data associated with the head and performance data associated with a plurality of heads; and
    adjusting an operating parameter value of the head based on the comparison value exceeding a threshold, the adjusted operating parameter reducing a likelihood that a laser of the head will exhibit write instability.

2. The method of claim 1 further comprising:
    calculating at least one temperature coefficient value applied to the laser based on a portion of the performance data associated the first set of write/read operations, and wherein the performing the second set of write/read operations comprises:
    performing the second set of write/read operations based on applying the at least one temperature coefficient value to the laser.

3. The method of claim 1, wherein the adjusting the operating parameter value comprises decreasing a bits per inch value used by the head in writing data.

4. The method of claim 1, wherein adjusting the operating parameter value comprises decreasing a tracks per inch value used by the head in writing data.

5. The method of claim 1, wherein the performance data associated with the head comprises a bit error rate value, and wherein the comparison value comprises bit error rate standard deviation value.

6. The method of claim 1, wherein the plurality of heads includes heads included in a plurality of hard drives.

7. The method of claim 1 further comprising:
    maintaining a final temperature of the increasing temperature ramp for a predetermined period of time, and wherein a starting temperature of the decreasing temperature ramp is equal to the final temperature of the increasing temperature ramp.

8. The method of claim 1, wherein a starting temperature of the increasing temperature ramp is equal to a final temperature of the decreasing temperature ramp, and a final temperature of the increasing temperature ramp is equal to a starting temperature of the decreasing temperature ramp.

9. The method of claim 1, wherein a starting temperature of the increasing temperature ramp is 30 C.

10. The method of claim 1, wherein a final temperature of the increasing temperature ramp is 65 C.

11. The method of claim 1, wherein the performing the first set of write/read operations using the head comprises repeatedly:
    performing a set of write/read operations at an ambient temperature; and
    increasing the ambient temperature by a predetermined amount.

12. The method of claim 11, wherein the predetermined amount is 0.5 C.

13. The method of claim 1, wherein a starting temperature of the decreasing temperature ramp is 65 C.

14. The method of claim 1, wherein a final temperature of the decreasing temperature ramp is 30 C.

15. The method of claim 1, wherein the performing the second set of write/read operations using the head comprises repeatedly:
    performing a set of write/read operations at an ambient temperature; and
    decreasing the ambient temperature by a predetermined amount.

16. The method of claim 15, wherein the predetermined amount is 0.5 C.

17. The method of claim 1, wherein the generating performance data comprises:
    generating, at a plurality of temperatures included in the increasing temperature ramp and the decreasing temperature ramp, performance data for each of a plurality of zones associated with head.

18. The method of claim 1, wherein the adjusting the operating parameter value comprises decreasing at least one of a bits per inch value or a tracks per inch value used by the head in writing data by five percent.

19. A method for calibrating a plurality of hard drives each having a plurality of heat-assisted magnetic recording heads, the method comprising:
    performing, for each head included in the plurality of hard drives and across an increasing temperature ramp, a first set of write/read operations using the head;
    performing, for each head included in the plurality of hard drives and across a decreasing temperature ramp, a second set of write/read operations using the head;
    generating, for each head included in the plurality of hard drives, performance data associated with the head based on the first set of write/read operations and the second set of write/read operations;
    calculating, for each head included in the plurality of hard drives, a comparison value based on the performance data associated with the head and performance data associated with other heads included in the plurality of hard drives;
    selecting at least one head included in the plurality of hard drives for adjustment based on the comparison value associated with each head included in the plurality of hard drives and a predetermined threshold; and
    adjusting, for each head included in the at least one head, an operating parameter value of the head, the adjusted operating parameter reducing a likelihood that a laser of the head will exhibit write instability.

20. A system for calibrating a plurality of hard drives each having a plurality of heat-assisted magnetic recording heads, the system comprising:
- a temperature controllable chamber containing the plurality of hard drives;
- a controller coupled to the temperature controllable chamber and configured to:
  - cause the temperature controllable chamber to increase temperature across a first temperature ramp;
  - perform, for each head included in the plurality of hard drives and across the first temperature ramp, a first set of write/read operations using the head;
  - cause the temperature controllable chamber to decrease temperature across a second temperature ramp;
  - perform, for each head included in the plurality of hard drives and across the second temperature ramp, a second set of write/read operations using the head;
  - generate, for each head included in the plurality of hard drives, performance data associated with the head based on the first set of write/read operations and the second set of write/read operations;
  - calculate, for each head included in the plurality of hard drives, a comparison value based on the performance data associated with the head and performance data associated with other heads included in the plurality of hard drives;
  - select at least one head included in the plurality of hard drives for adjustment based on the comparison value associated with each head included in the plurality of hard drives and a predetermined threshold; and
  - adjust, for each head included in the at least one head, an operating parameter value of the head, the adjusted operating parameter reducing a likelihood that a laser of the head will exhibit write instability.

* * * * *